No. 827,113. PATENTED JULY 31, 1906.
W. OPPENHEIMER.
TREATMENT OF TAR FOR THE MANUFACTURE OF PITCH AND RECOVERY OF LIGHT OILS.
APPLICATION FILED AUG. 27, 1903.
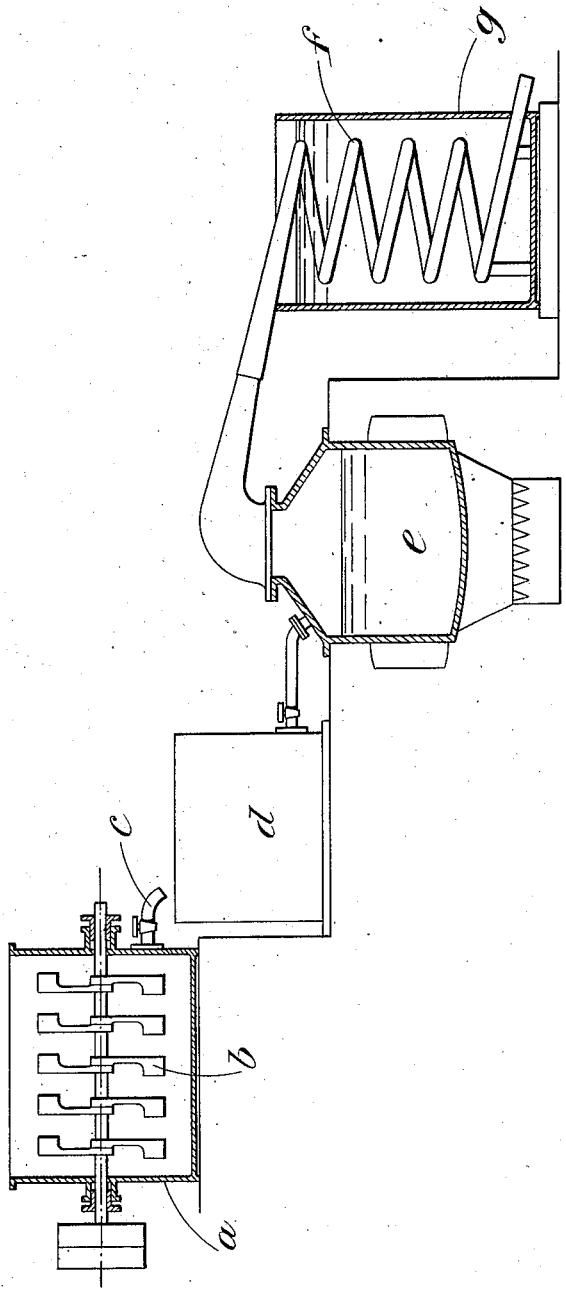
WITNESSES:
Henry J. Brockwell.
H. R. Forster.
INVENTOR:
W. Oppenheimer
by Fairfax & Wetter
Attorneys

UNITED STATES PATENT OFFICE.

WILLIAM OPPENHEIMER, OF EWELL, ENGLAND.

TREATMENT OF TAR FOR THE MANUFACTURE OF PITCH AND RECOVERY OF LIGHT OILS.

No. 827,113.      Specification of Letters Patent.      Patented July 31, 1906.

Application filed August 27, 1903. Serial No. 171,012.

*To all whom it may concern:*

Be it known that I, WILLIAM OPPENHEIMER, a subject of the King of Great Britain and Ireland, residing at Ewell, Surrey, England, (whose post-office address is Ewell Castle, Ewell, Surrey,) have invented a certain new and useful Improvement in the Treatment of Tar for the Manufacture of Pitch and Recovery of Light Oils, (for which I have applied for a patent in Great Britain on the 5th day of June, 1903; in Germany on the 15th day of July, 1903; in Austria on the 1st day of August, 1903; in Hungary on the 3d day of August, 1903; in Belgium on the 7th day of August, 1903, and in France on the 7th day of August, 1903,) of which the following is a specification.

The present invention relates to the treatment of tar deposited from carbureted water-gas.

In carbureting water-gas by means of mineral oil the lightest hydrocarbons contained in the latter are evaporated and added to the gas, while the heavier hydrocarbons, together with any other substances which may be contained in the mineral oil, yield the tar. This tar always contains water, which can only be separated with great difficulty, owing to its specific gravity being almost the same as that of the tar. For the rational industrial utilization of this kind of tar, however, the water contained in it is a great obstacle. During its distillation violent and dangerous commotion takes place. Moreover, the water condensed on the cooler walls of the retort flows back and causes unpleasant phenomena upon coming in contact with the boiling oil. In consequence of these difficulties the usual method of utilizing this kind of tar consists in converting it into pitch by heating the tar in open receptacles and allowing the volatile products to escape.

The present invention has for its object to recover the volatile oils of the tar as well as the pitch. For this purpose the tar is first relieved of its water by chemical means before subjecting it to distillation in a retort.

The removal of the water is preferably effected by means of caustic lime (CaO) or burnt gypsum, ($CaSO_4$,) which materials are known to absorb water and to combine chemically with the same, while forming calcium hydrate, $Ca(OH)_2$, or calcium sulfate, ($CaSO_4 + 2H_2O$.)

For carrying out this process an average sample of the tar to be worked up (which forms a thin and practically non-viscous liquid) is carefully tested as regards the quantity of water contained in it, after which the necessary quantity of caustic lime or burnt gypsum is ascertained by calculation and carefully mixed with the tar. The latter is then allowed to stand until the calcium hydrate or the hydrated calcium sulfate formed by this procedure has settled at the bottom, after which the tar, still forming a thin liquid, is drawn off and subjected to fractional distillation in a retort. When the caustic lime or the anhydrous calcium sulfate has chemically absorbed the whole of the water, thereby forming calcium hydrate or hydrated calcium sulfate, as mentioned above, the compound of lime thus produced settles at the bottom of the receptacle in a physically dry state. This separation or precipitation takes place very easily and smoothly, because water-gas tar, unlike ordinary coal-tar, is a very thin liquid.

The treatment of the tar with the lime or burnt gypsum may take place in an ordinary mixing vessel or tank provided with an agitator, and for the distillation of the tar which has been drawn off after the treatment an ordinary still and cooling apparatus may be used.

The accompanying drawing shows the general arrangement of apparatus which may be used for performing my invention.

*a* represents a mixing-tank containing a rotary agitator *b* and provided with a draw-off cock *c*, from which the dehydrated tar may be drawn off into an intermediate tank *d* or directly into the still *e*. The vapors formed in the latter are conducted through a pipe-coil *f*, mounted in a tank *g*, filled with cold water, and are thereby condensed.

In case caustic lime is used for dehydration the slaked lime thereby obtained may of course be treated for the recovery of caustic lime in a suitable kiln, and the oily matter adhering to it may be recovered at the same time.

The advantages resulting from my process are as follows: First, the tar which has been deprived of water yields a much more brilliant and more valuable quality of pitch than that which can be obtained by simply heating the water-gas tar in an open receptacle and allowing the volatile products to escape; secondly, the valuable volatile constituents of tar, which with the usual method of working are allowed to escape as a waste product, may be recovered by known methods as products of the fractional distillation of the specially-prepared tar.

It is not new to treat tar with lime, such a process having been described, for instance, in the specification of British Patent No. 1,910 of 1858, which relates to the treatment of ordinary coal-tar by mixing it with sufficient lime to produce a perfectly dry paste which will not liquefy at the temperature used in the distillation of tar, the said dry paste being then heated for obtaining gaseous and liquid products. My invention is limited to the treatment of water-gas tar, which alone produces the results described above.

What I claim is—

1. The process for the utilization of water-gas tar, which consists in first depriving the tar of water by mixing it with a calcareous compound adapted to absorb water by forming a chemical combination with the same, then allowing the mixture to stand, mechanically separating the calcareous matter from the tar and subjecting the tar to distillation, substantially as described and for the purpose specified.

2. The process for the utilization of water-gas tar, which consists in first relieving the tar of water by treatment with caustic lime, then mechanically separating the tar from the lime, and subjecting it to distillation, substantially as described and for the purpose specified.

In witness whereof I have hereunto signed my name in the presence of two subscribing witnesses.

WILLIAM OPPENHEIMER.

Witnesses:
  H. D. JAMESON,
  C. P. LIDDON.